United States Patent
Boyce

(10) Patent No.: US 8,466,575 B2
(45) Date of Patent: Jun. 18, 2013

(54) SELF-PROPELLED, LATERALLY DEPLOYED, OCEAN WAVE ENERGY CONVERTING POWER PLANT/BEACH REPLENISHMENT SYSTEM/OIL SPILL CONTAINMENT BOOM

(76) Inventor: Peter Frank Boyce, Delmont, NJ (US)

(*) Notice: Subject to any disclaimer, the term of this patent is extended or adjusted under 35 U.S.C. 154(b) by 455 days.

(21) Appl. No.: 12/661,255

(22) Filed: Mar. 15, 2010

(65) Prior Publication Data

US 2011/0221199 A1    Sep. 15, 2011

(51) Int. Cl.
  *F03B 13/10*   (2006.01)
  *F03B 13/12*   (2006.01)
  *H02P 9/04*    (2006.01)

(52) U.S. Cl.
  USPC .......................................................... 290/53

(58) Field of Classification Search
  USPC ........................................ 290/53, 42, 54, 43
  See application file for complete search history.

(56) References Cited

U.S. PATENT DOCUMENTS

| | | | | |
|---|---|---|---|---|
| 4,252,162 A * | 2/1981 | Le Devehat | .................... | 141/387 |
| 4,608,497 A * | 8/1986 | Boyce | .............................. | 290/53 |
| 4,748,338 A * | 5/1988 | Boyce | .............................. | 290/42 |
| 6,647,716 B2 * | 11/2003 | Boyd | .............................. | 60/398 |
| 2010/0148517 A1 * | 6/2010 | Duclos | .......................... | 290/1 C |

* cited by examiner

*Primary Examiner* — Javaid Nasri

(57) ABSTRACT

Deployed laterally (broadside to the waves), this power plant hydraulically converts the breadth of waves into electricity. Costly hydraulic motors, generators Etc. need not be duplicated for each unit in series. Depleted waves break gently. Sand put into suspension by the turbulent release of energy from waves crashing onto un-harvested beaches, carried by the alongshore current to calm water, settles and remains. Replenishment is the natural by-product of wave energy conversion, avoiding costly, environmentally intrusive dredging and pumping. At sea, extensions aid energy harvesting from swells. In series, it defends against oil spills Etc. from washing up onto beaches. Free floating, easily removed for maintenance when tourism takes priority over energy, beach replenishment and oil spill protection. When the series is to be transported over long distances at sea, inclined planes can be pivoted 90 degrees enabling the series to be self-propelled by the swells to its new site.

5 Claims, 8 Drawing Sheets

SELF-PROPELLED, LATERALLY DEPLOYED, OCEAN WAVE ENERGY CONVERTING POWER PLANT/BEACH REPLENISHMENT SYSTEM/OIL SPILL CONTAINMENT BOOM

BACKGROUND

The compelling need for clean energy from renewable natural resources has led to many ingenious approaches to the harvesting of energy from ocean waves. Recognizing that, if the technology to harvest this new frontier of alternative energy is to ever become both cost effective and environmentally acclaimed, many issues needed to be addressed and resolved technologically within one system.

The first issue needing attention was the costly duplication of such components as hydraulic pumps, gear motors and generators generally associated with each unit of a wave energy converting power plant. This was solved by designing the system to be in a series and eliminating every component from each unit of the series which could otherwise be handled by just one of that component for all the units of the entire series.

Second, the series would need to harvest the energy from the entire breadth of the approaching waves rather than just a cross section. This was solved by deploying the series laterally to the waves (parallel to the shore).

Third, the series would need to be designed to be as small as possible and yet still harvest the maximum wave energy for its size. This was solved by deployment close to shore where the waves stack up and the lengths become shorter due to the contour of the bottom. In the area just beyond the breaker zone, the smallest possible units can harvest the wave energy where it is most concentrated.

Fourth the series would need to be strong and resilient to withstand the extreme forces lateral deployment just beyond the breakers would subject it to. This was solved by the use of two parallel pontoons, supporting pyramidal structures from which in turn is suspended a weighted pendulum.

Fifth, being deployed so close to shore, the effect that the by-product of such efficient wave energy conversion (depleted waves), would have on the beach being harvested would have to be addressed. A coastal community that is loosing revenue derived from tourism due to the erosion of their beach from the turbulent release of energy from waves crashing on their beach (putting the sand into suspension for the along shore current to carry away), would be thrilled to have a system deployed which would not only produce clean energy from a renewable resource but replenish and protect their beach to a gradually sloping natural contour in the bargain. But, once their beach was replenished, the series would need to be easily removable so the beach over the years would not become so large that tourists need a camel to cross the beach and get to the water. It would need to be easily removable for two more reasons, that the view of the seascape by tourists not be obscured and that the full strength of the waves should be available during tourist season for bathers and surfers to enjoy. (Note—The common approach to beach replenishment using dredging and pumping which is costly, tends to result in a beach profile which drops off sharply due to an effort to get the maximum beach area for the available beach replenishment funds. This sharp profile causes the waves to break abruptly, casting bathers and surfers headlong into the sand too often resulting in tragic spinal cord injuries). This need for mobility was accomplished by keeping the series free floating, tethered to buoys or anchored with simple common boat anchors thereby both avoiding the cost of permanent foundations on the ocean floor, ameliorating the environmental impact to the seabed and providing for ease of removal for deployment farther out to sea.

Sixth, the series being moved out to sea during the months of tourism needed to be adaptable to efficiently harness the ocean swells which have much greater wave lengths than the waves near the breaker zone, otherwise the series would be either functioning inefficiently or in down time sitting idle in dry dock. This potential loss of efficiency or down time was solved by engineering extensions to the pendulum with inclined plates extending beneath the ocean swells. The use of these extensions overcome the inability of such small units to straddle the crests and troughs of the broad swells as they did on the stacked up waves near the breaker zone which induced the swing of the pendulum. The extensions reaching down to the still water beneath the swells with inclined planes, allows the units to harvest the energy based upon the entire series being lifted by the swell while the action of the inclined planes beneath apply that force to the pendulum due to their being thrust by the upward pull, in the direction of their upward inclination.

Seventh, when the series is out at sea, a means of enabling the series to travel under its own power to areas of the ocean where there may be greater energy available from storms would be desirable. This was accomplished engineering a means of providing for a simple 90 degree turn of the extensions/planes to a fore/aft alignment thereby diverting the power which otherwise would be to the pendulum and the hydraulic cylinders instead directly to the forward propulsion of the entire series.

Eighth, while the technology of ocean wave energy conversion is very promising, it is still in its infancy. Our nation continues to rely upon other older non-renewable sources of energy. Offshore oil drilling carries with it, the inherent danger of potential spills and of those spills washing up onto beaches. A means of protecting the beaches from such ecological disaster would be an invaluable service to both the environment and the economies of coastal towns, dependant upon tourism. This was very simply accomplished by taking advantage of the fact that the wave energy power plant is meant ideally to be deployed in a continuous floating series, parallel to the coast, 24 hours per day 7 days per week. By simply adding a continuous apron extending beneath the surface several feet with a weighted edge along the side of the seaward pontoon, the entire system serves as an oil spill containment boom, capable of preventing not only oil but trash, debris and medical waste from washing up onto the beaches wherever its deployed.

BRIEF SUMMARY

An ocean wave energy converting power plant, designed primarily to be deployed in a series laterally (parallel to the shore), just beyond the breaker zone. When so deployed, the smallest possible units both harvest the wave energy when it is most concentrated and serve to replenish the beach sand as a by-product of that harvesting. The system fitted with an apron serves also as an oil spill containment boom defending the beach where deployed from oil, trash, debris and medical waste from washing up. During times of peak tourism, so as to not obscure the view or diminish the waves, it is easily removed and refitted for deep water deployment with extensions that can be rotated so as to self-propel the series to a new location. When rotated back, the series can immediately begin harvesting the energy from the broad ocean swells. It is basically two continuous pontoons, a series of pyramidal support structures from which is suspended a weighted pendulum, the swinging motion of which (from the action of the waves on the pontoons) acts on hydraulic cylinders which drive an hydraulic motor and generator. This system has been designed to; be inexpensive to manufacture, harvest the entire breadth of the approaching waves, replenish and protect the beaches, be self-propelled and serve as an oil containment boom protecting the environmentally sensitive beaches from oil spills.

DETAILED DESCRIPTION

Figure 1:
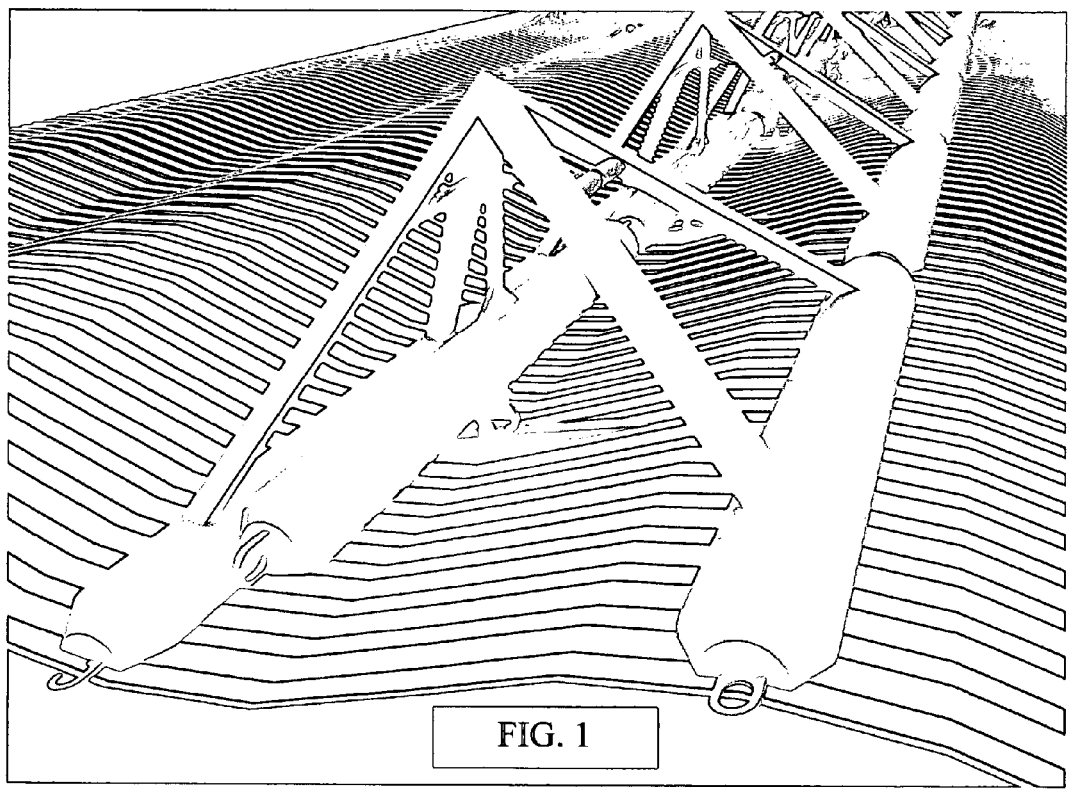
FIG. 1) 3D Perspective Front Page View of units in series rigged for deployment parallel to shore just beyond the breaker zone.
Figure 2:
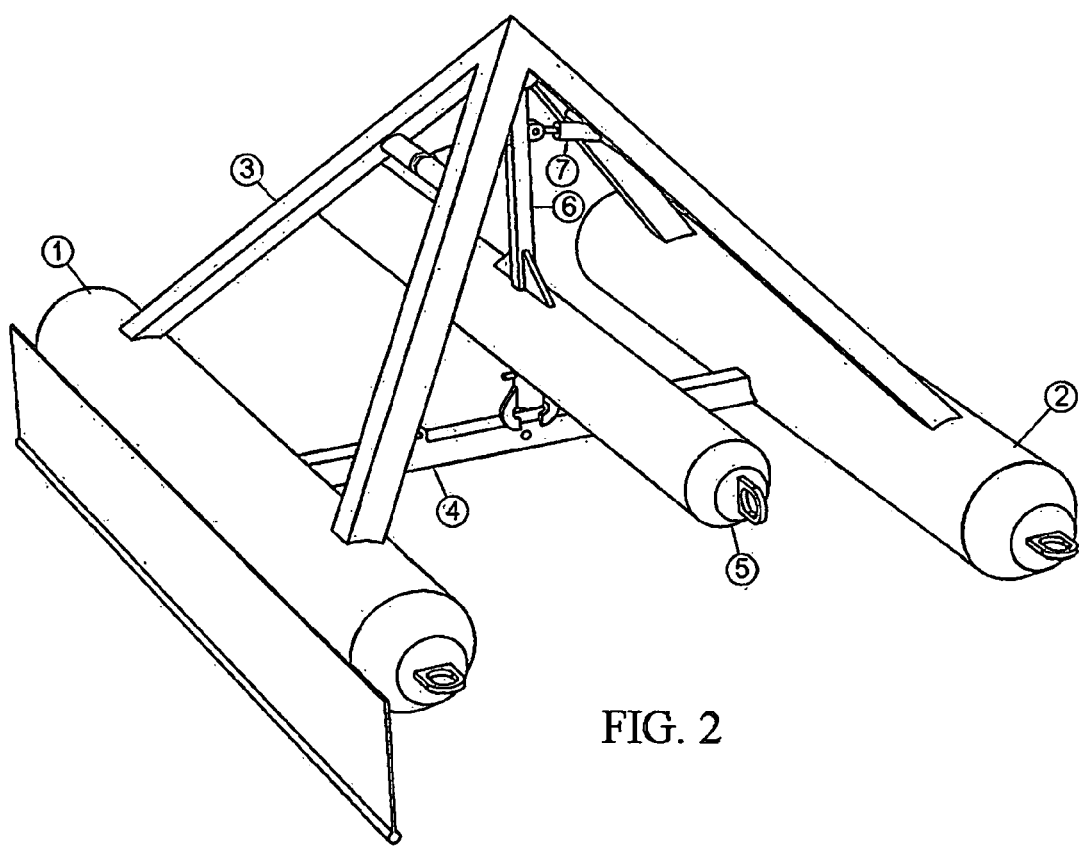
FIG. 2) 3D Perspective View of a single unit of the power plant rigged for deployment just seaward of the breaker zone with pendulum and with hydraulic cylinders in their upper mounting brackets.
Figure 3:
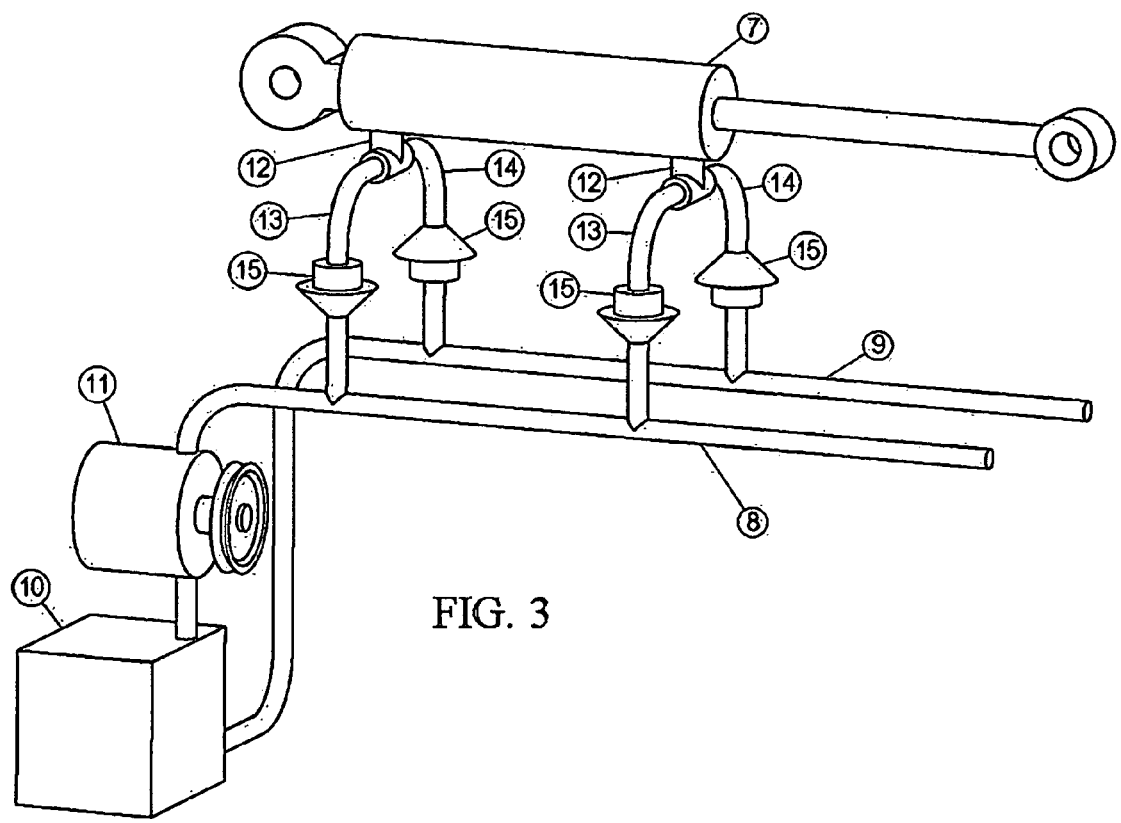
FIG. 3) 3D View of Schematic of the hydraulic system.

Buoyant parallel members (FIG. 2) #1 and #2 deployed laterally (broadside to the approaching waves), ideally just seaward of the breaker zone, rise and fall alternately affected by the crests and troughs of the waves. Mounted to these buoyant members are a series of pyramidal supporting structures (FIG. 2) #3 consisting of upwardly rising beams as well as cross beams (FIG. 2) #4 to prevent the buoyant members from spreading apart. From these structures a pendulum (FIG. 2) #5, which may be either solid or filled with sand or seawater, is suspended from a rigid member (FIG. 2) #6 which both supports and extends below the pendulum. A hydraulic cylinder (FIG. 2) #7, mounted between the rigid member and the supporting structure, pumps hydraulic fluid to the main hydraulic pressure line (FIG. 3) #8 and draws fluid from the main hydraulic return line (FIG. 3) #9. The main lines run the entire length of the series to a hydraulic fluid reservoir (FIG. 3) #10 and a hydraulic motor (FIG. 3) #11 which may then be used to drive other machinery such as but not limited to a variable speed gear motor, generator, alternator compressor or propeller. The hydraulic motor need not be located on the series. Provided the main hydraulic lines run to it, the motor could be located on a boat, barge, or even in an on-shore, off-shore or underwater structure. The hydraulic fluid is pumped under pressure by each cylinder on both the expanding and contracting strokes. This is accomplished by each cylinder having a "T" on each end (FIG. 3) #12. To one opening of the "T" a pressure feeder line (FIG. 3) #13 is connected and to the other opening a return feeder line (FIG. 3) #14 is connected making a total of 4 feeder lines per cylinder. In each of these four feeder lines is a check valve (FIG. 3) #15 which directs the flow of fluid always in the same direction regardless of the direction of swing of the pendulum. These lines of each unit in the series connect to the main pressure and return lines of the series.

Figure 4:
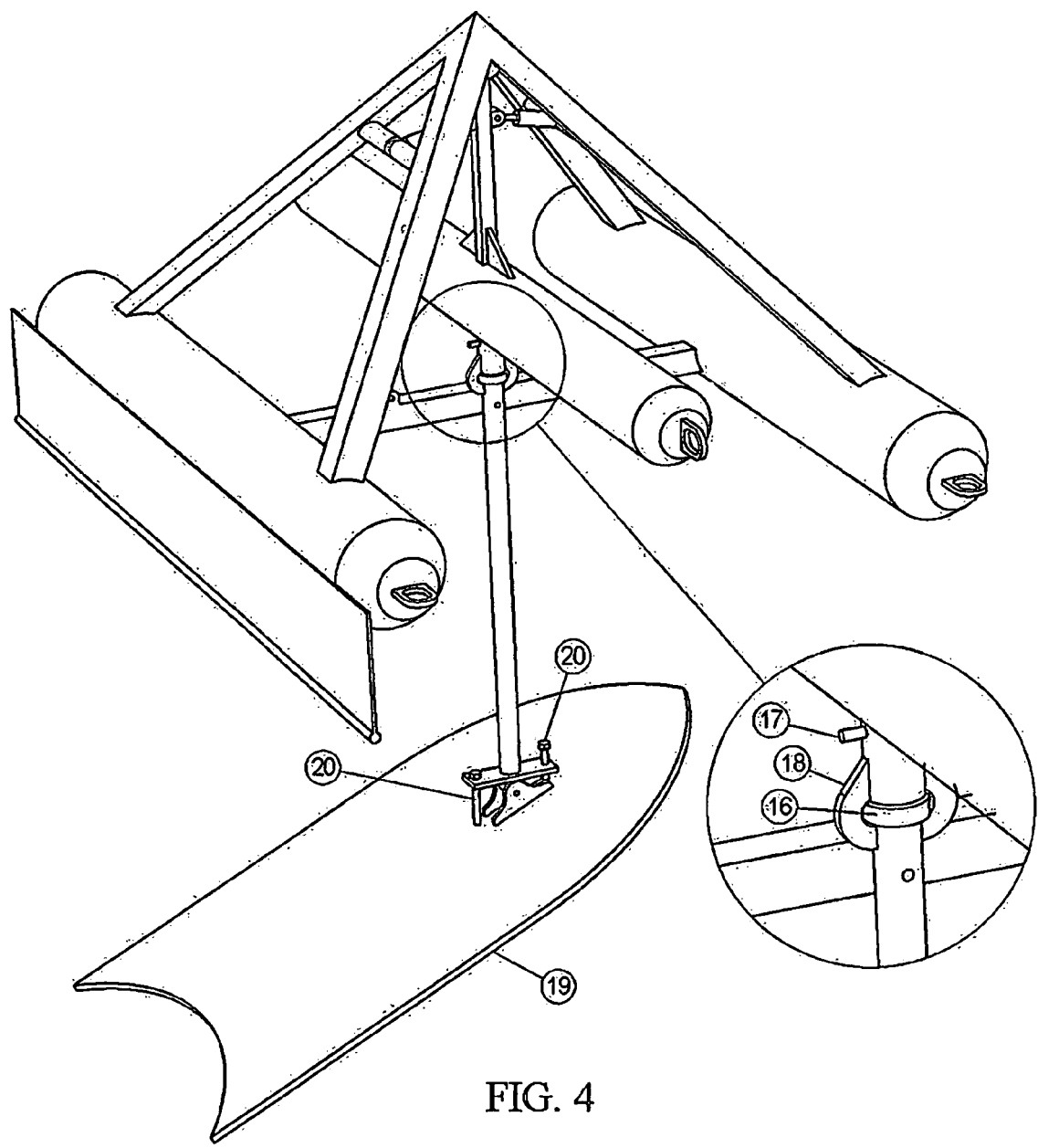
FIG. 4) 3D Perspective View of a single unit rigged for temporary deep water deployment, with pendulum extension deep water adapter attached and close up of connecting collar.
Figure 5:
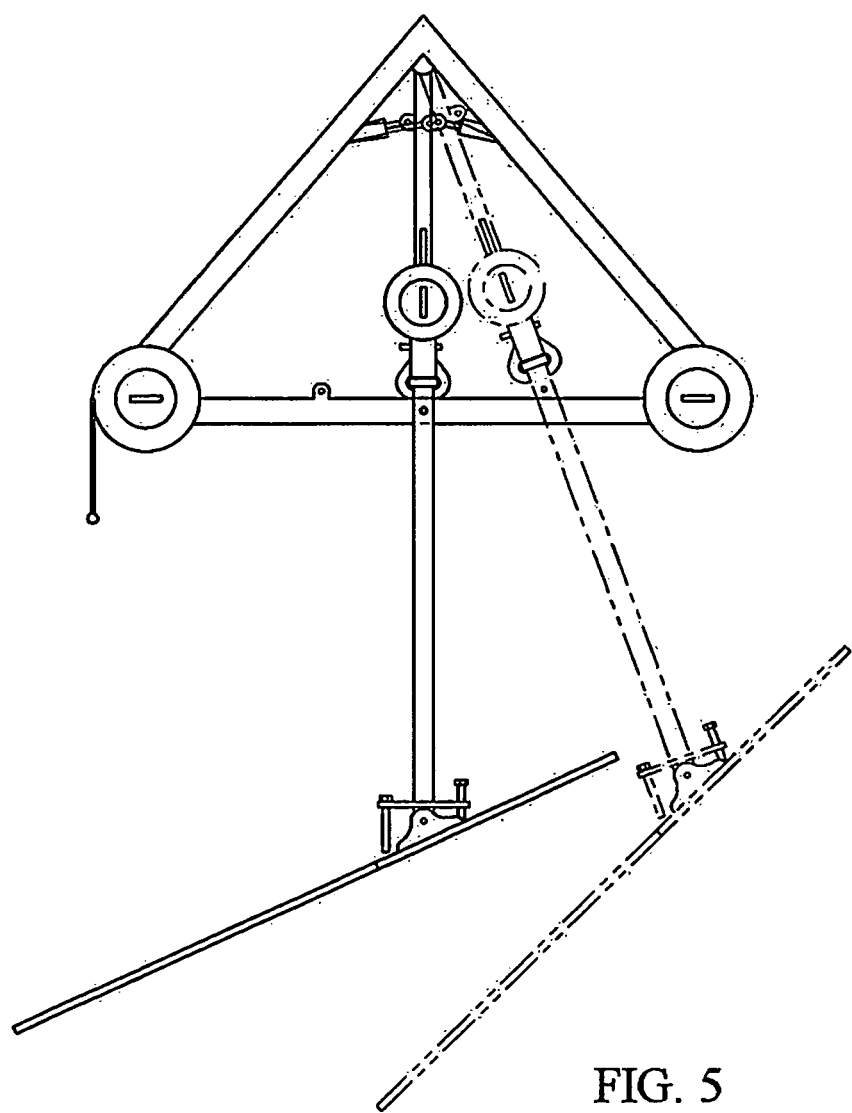
FIG. 5) 2D View of a complete single unit with deep water removable pendulum extension attached showing pendulum with attachment in swing position during power stroke.
Figure 6:
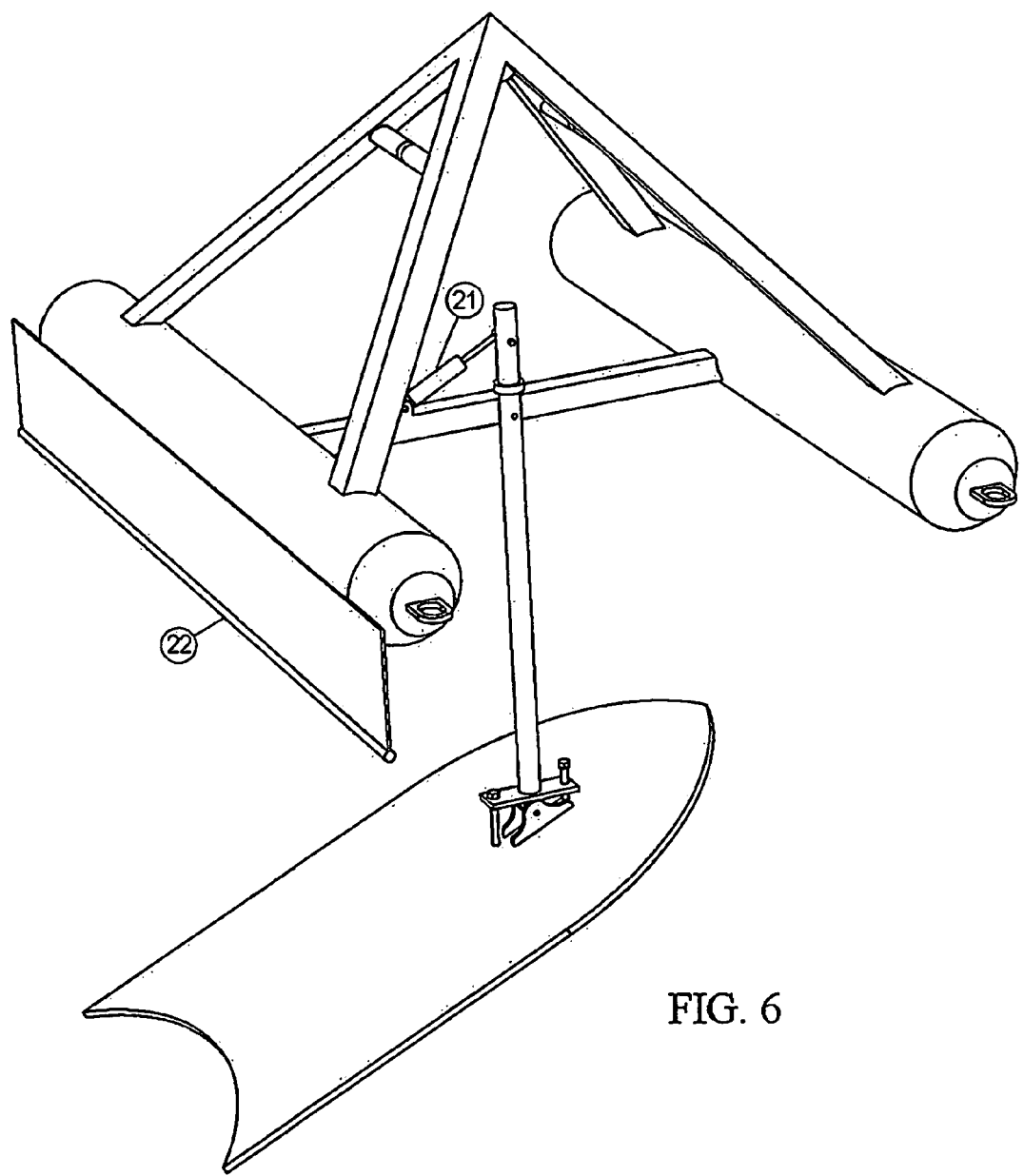
FIG. 6) 3D Perspective View of a single unit rigged for permanent deep water deployment with pendulum and rigid member removed, pendulum extending deep water adapter pinned in place and hydraulic cylinder in place on lower mounting bracket and oil spill containment boom attached.
Figure 7:
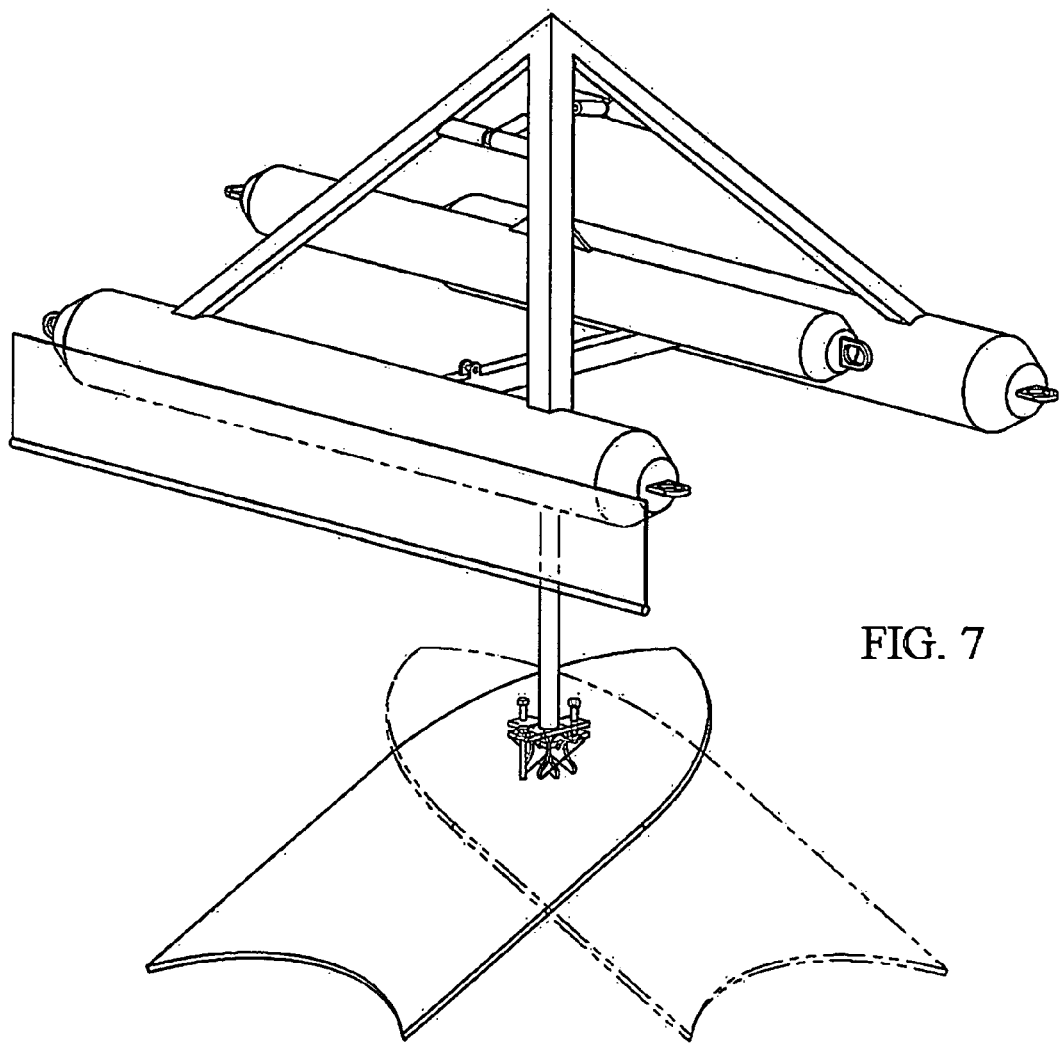
FIG. 7) 3D Perspective View of single unit with pendulum and deep water pendulum extension attached, showing extension with inclined planes being rotated to propulsion position.
Figure 8:
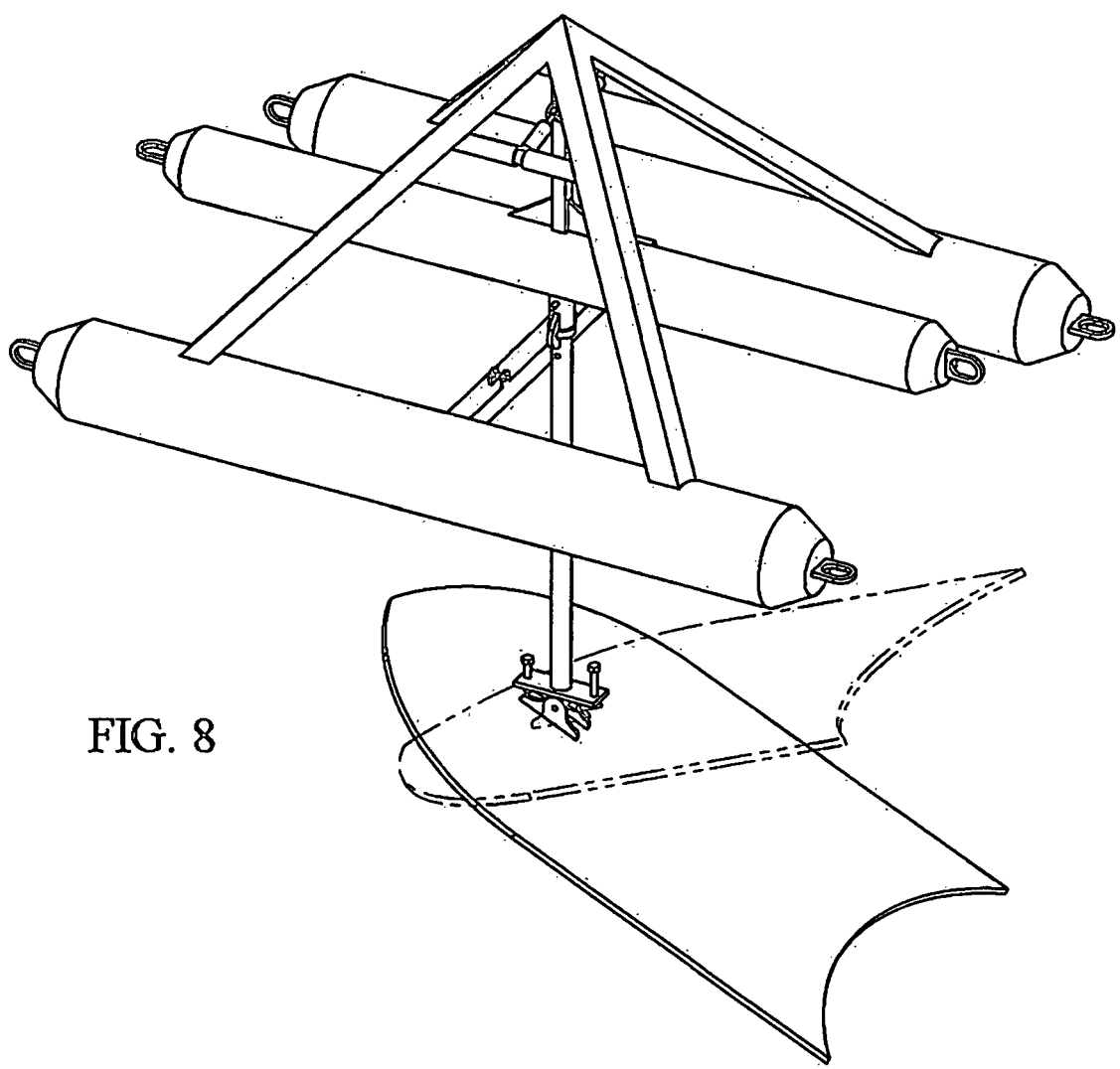
FIG. 8) 3D Perspective View of single unit with pendulum and deep water pendulum extension attached, showing angle of inclined plane pivoting upward and downward during propulsion mode.

When the series is temporarily deployed farther out to sea, removable pendulum extensions (FIG. 4) may be attached to the rigid members where they extend below the pendulums, to better harness the energy of the broader ocean swells. The removable pendulum extensions slide into collars (FIG. 4) #16 and are held fast with set screws in the collar and a locking pin (FIG. 4) #17 through the extension and that part of the rigid member which extends below the pendulum. The collars are held by brackets (FIG. 4) #18 attached to the rigid members. The extensions extend down into the water, ideally, to a depth of still water below the swells. At their lower ends, the pendulum extensions are connected to a series of inclined planes (FIG. 4) #19 at a point forward of center so that at rest the greater weight to one side of the plane than the other will maintain a default angle of inclination. The planes are mounted to the pendulum extensions forming a pendulum extension assembly so as to permit the inclined plane to pivot freely up or down between two stops (FIG. 4) #20 mounted on the pendulum extension. These stops may be adjusted to alter the default angles of inclination. As a swell approaches and begins to lift the series the force upon the planes being pulled upward causes the planes to be thrust in the direction of their upward edge thus exerting force upon the rigid members and the hydraulic cylinders attached to them. This is the power stroke. As the swell passes underneath the weight of the pendulum returns the inclined plane to its original position. This is the return stroke. When the series is to be deployed on the swells of the open sea for long periods (FIG. 6), the pendulum and rigid members can be removed and only the pendulum extension assemblies be used, by mounting them on the centers of the cross beams, that they may pivot on a pin through the locking pin hole of the extension and a hole through the middle of the cross beam. The hydraulic cylinders being relocated, mounted to brackets (FIG. 6) #21 on the cross beams at their lower ends and to a hole in the upper end of the extensions on their upper ends.

The pendulum extensions with attached inclined planes can be rotated 180 degrees by removing the locking pins and reinserting them after rotation, so as to efficiently harvest with a power stroke, the energy of swells approaching from either the port or starboard sides of the series. Attached to the outer sides of the buoyant members are continuous aprons (FIG. 6) #22 with a weighted lower edge extending several feet below the waters' surface to serve as a means of preventing oil spills from getting past the series to shore.

When the series is to be transported over long distances at sea, the pendulum extensions can be rotated 90 degrees thus enabling the incline of the plates to be in a fore and aft alignment with the series. Because the pendulum does not swing fore and aft, when the series rises, lifted by a swell the power stroke propels the entire series forward. As the series falls again in the trough of the swells, the angle of the inclined planes is forced to reverse due to the upward force of the water beneath. From the weight of the series on the inclined planes now angled downward, the series is again thrust forward, surfing as it were on its now downward angled inclined planes. In this manner the series is propelled forward for sea travel as it rises and falls in the swells.

I claim:

1. In an apparatus for extracting energy from waves and swells on a body of water, having no ocean water being transferred during energy extraction, including an assembly having a buoyancy sufficient for maintaining the apparatus afloat in the water, upwardly oriented beams mounted on the assembly, having upper ends connected to one another, the improvements comprising: a) a pendulum which may be solid or filled with sand, seawater or other material, suspended by a rigid member from the upwardly oriented beams and which does not rotate but only swings side to side from wave action upon buoyant parallel members which are not motorized, do not swivel and are held apart a fixed distance by a cross beam and which pendulum does not include a generator or ratcheted pulleys or storage chamber with a compressible air pocket or any wind producing fan or any inboard or outboard arm members and does not serve to pressurize any ocean water b) a hydraulic cylinder mounted between the upwardly oriented beams and the rigid member I pendulum extension assembly, the hydraulic cylinder having a "T" at each end and which cylinder does not function as any part of an articulated loading arm c) hydraulic feeder lines connected to both openings on each of two "T"s on the hydraulic cylinder, being 4 feeder lines per cylinder, with each feeder line fitted with a check valve d) two main hydraulic lines, one pressure and one return to each of which one of the feeder lines fitted with a check valve from each end of the hydraulic cylinder connect e) a hydraulic motor not mounted on the pendulum to which the main hydraulic pressure line connects and which does not function as any component of an articulated loading arm f) a hydraulic fluid reservoir not mounted on the pendulum which supplies hydraulic fluid to the hydraulic motor to which the main hydraulic return line connects.

2. An apparatus as defined in claim 1 further comprising a removable pendulum extension assembly consisting of: a) a rigid member extension to the rigid member, attached with a collar to permit the extension to rotate b) an inclined plane which pivots up or down attached to the bottom of the rigid member extension c) adjustable stops attached to the rigid member extension that limit the angles of inclination of the inclined plane to desired defaults.

3. An apparatus as defined in claim 2 with the removable pendulum extension assembly attached to the cross beam.

4. An apparatus as described in claim 1 deployed in series.

5. An apparatus as defined in claim 1 further comprising a continuous apron attached to the buoyant parallel members of the apparatus and extending downward several feet.

* * * * *